G. W. NORTH.
BALING PRESS.
APPLICATION FILED APR. 13, 1918.

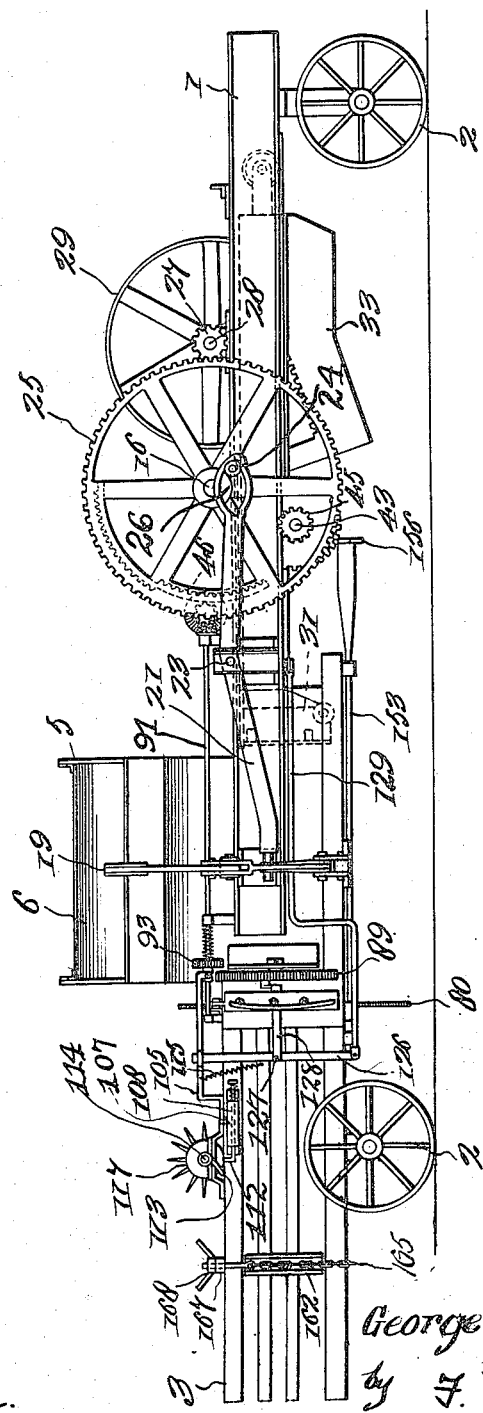

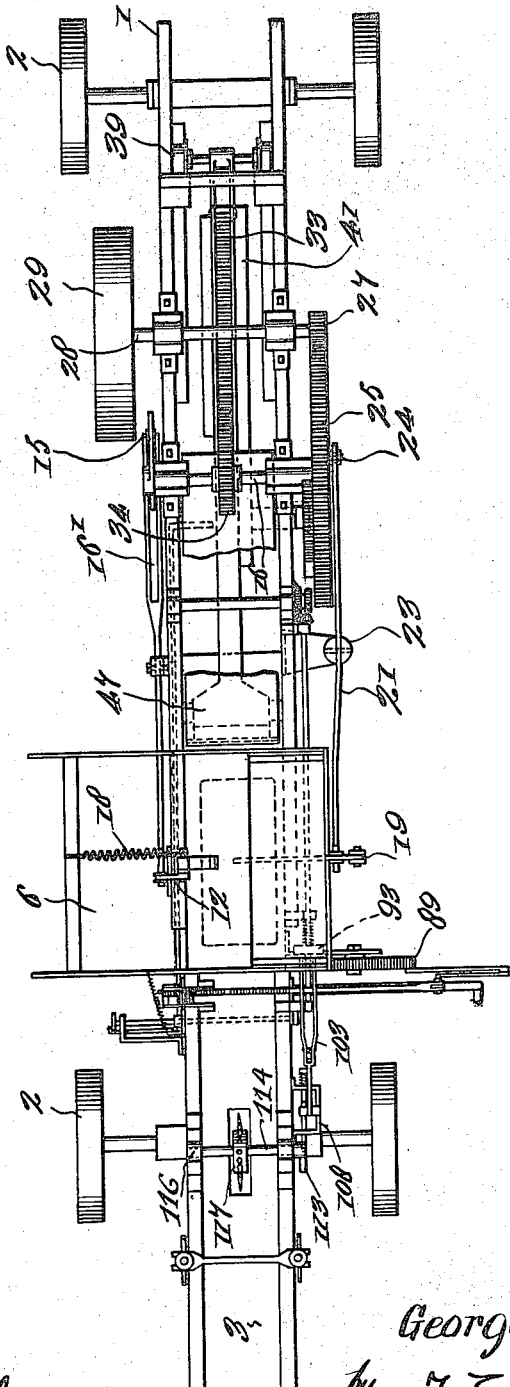

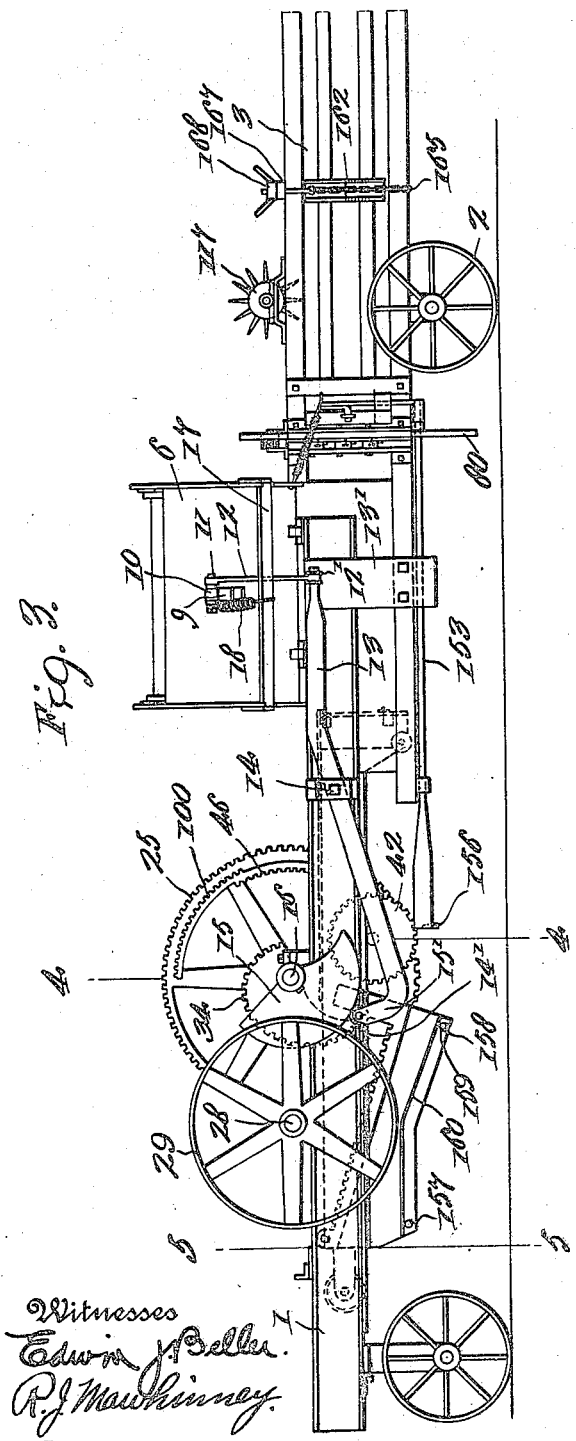

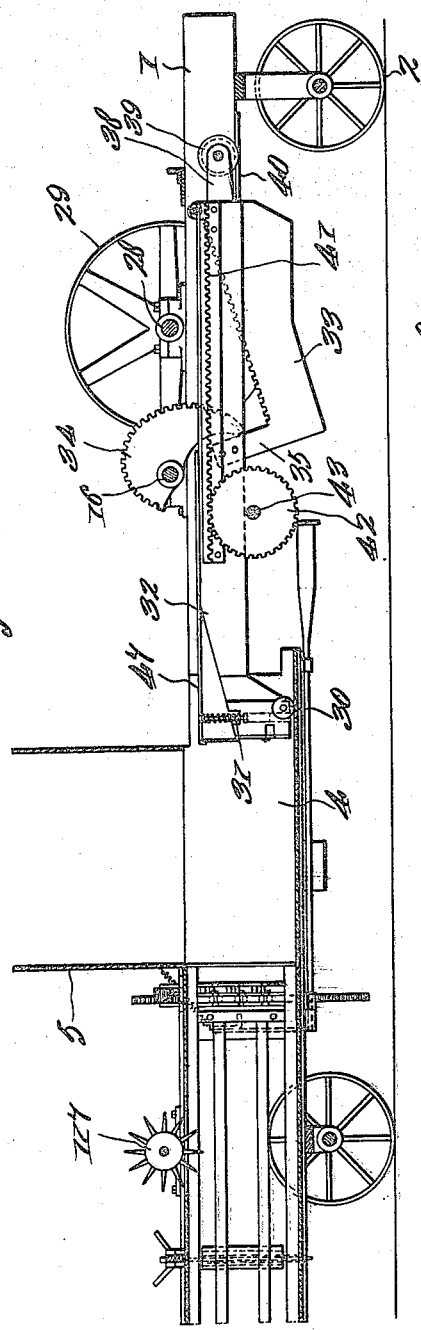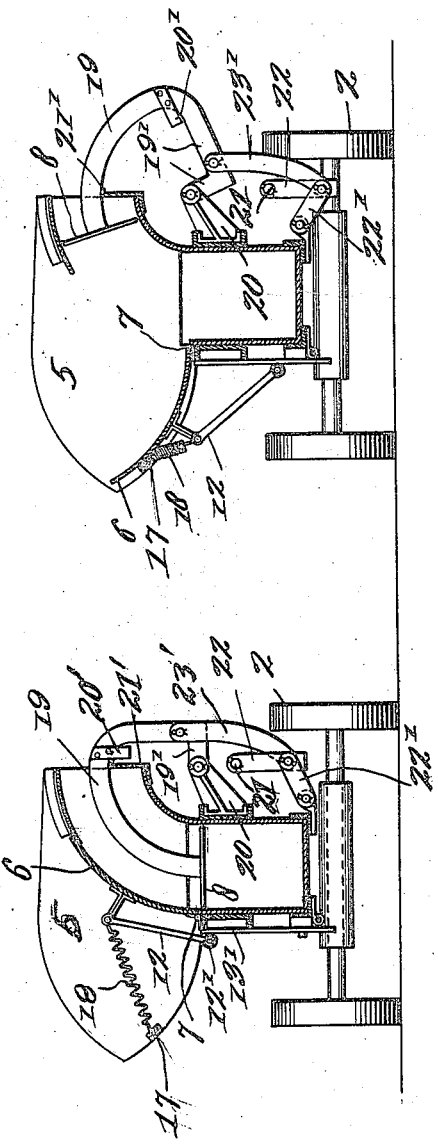

1,288,656.

Patented Dec. 24, 1918.
10 SHEETS—SHEET 5.

Witnesses
Edwin J. Beller.
R. J. Mawhinney.

Inventor
George W. North.
by F. E. Hunter.
Attorney.

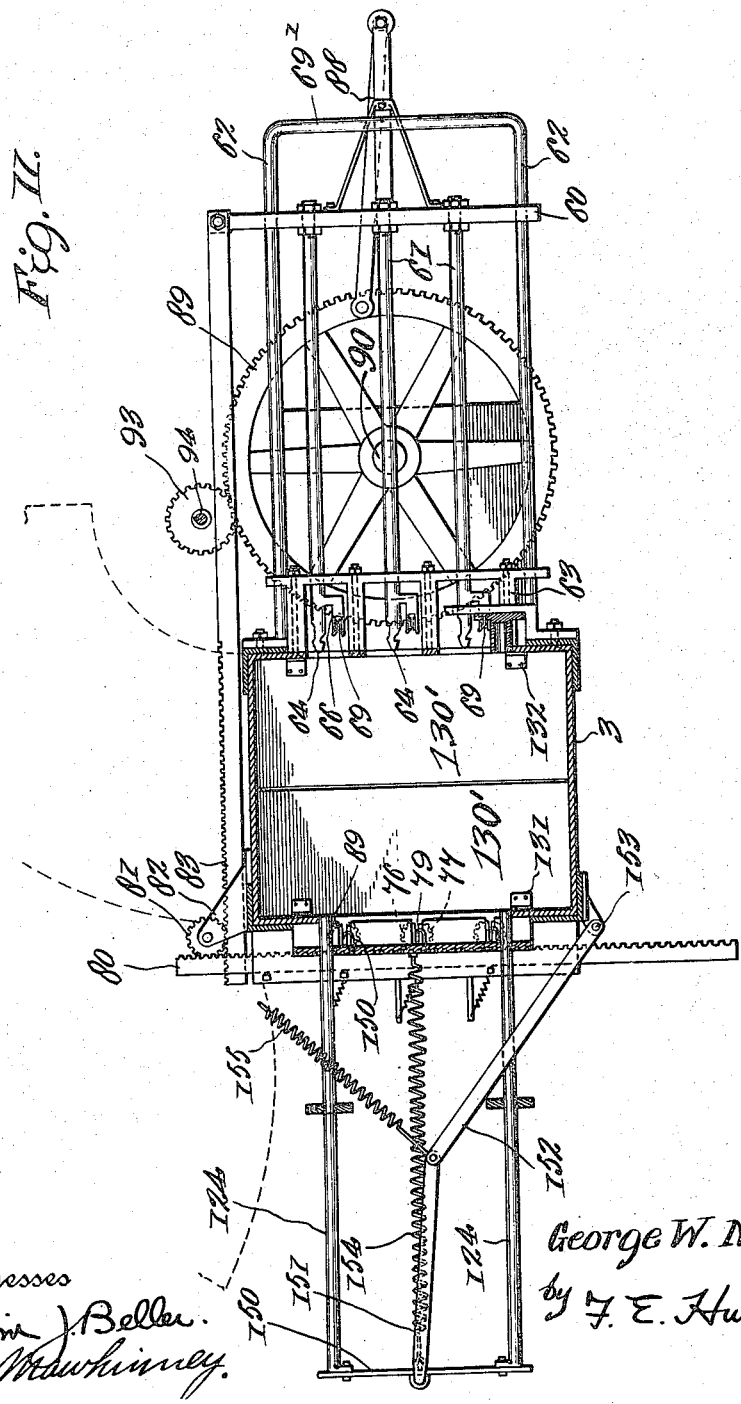

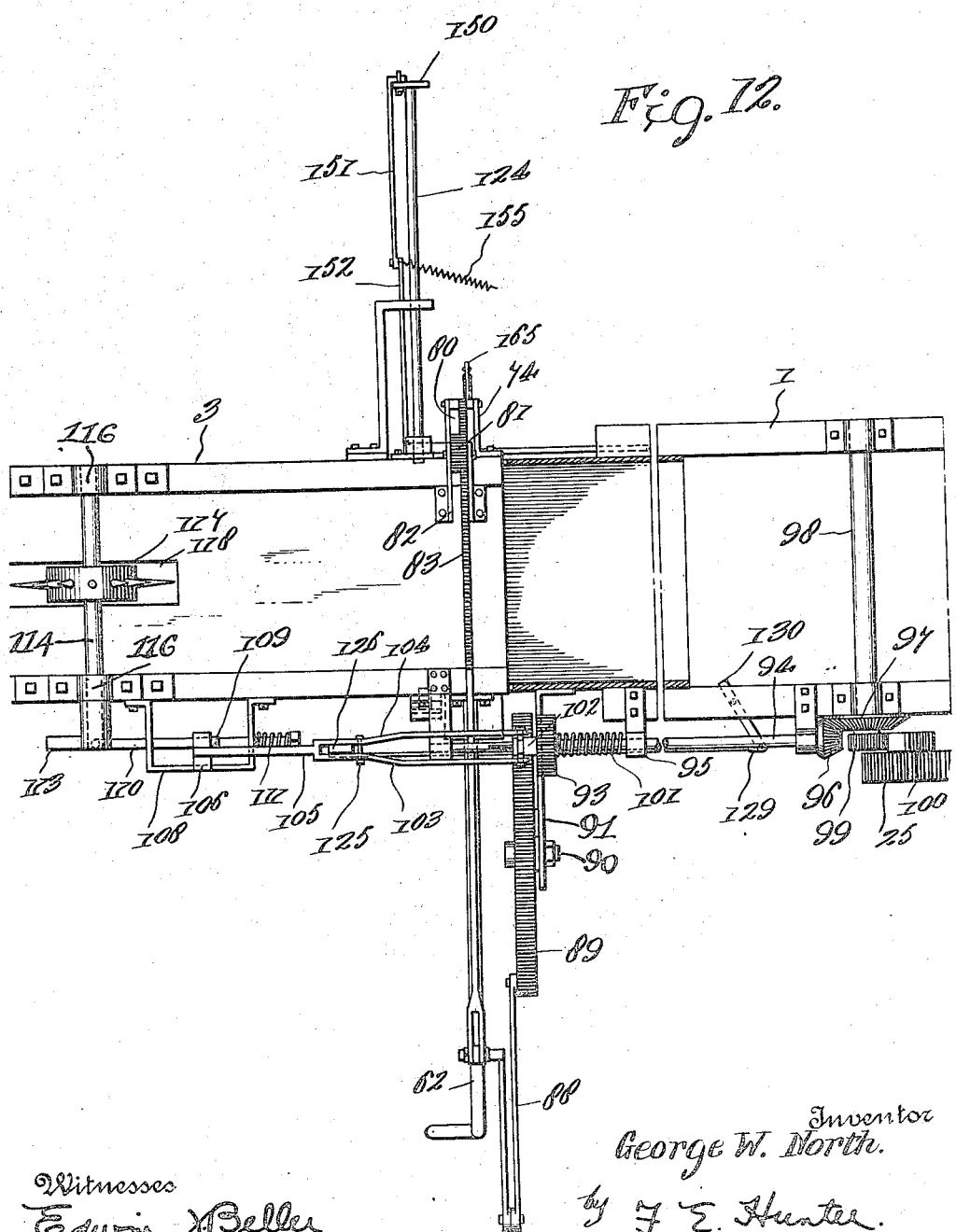

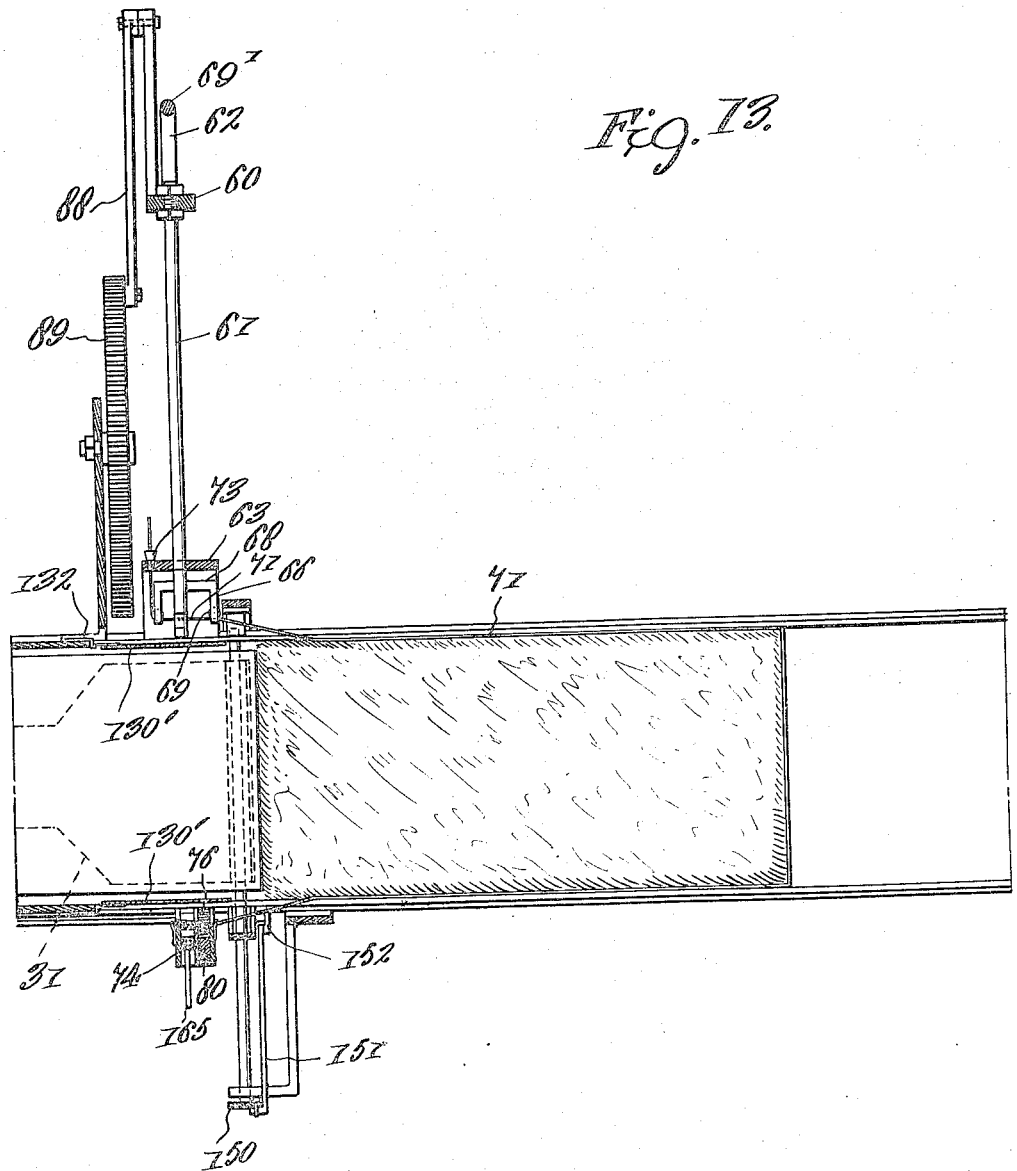

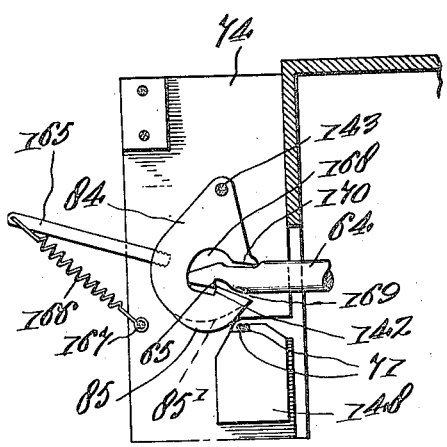
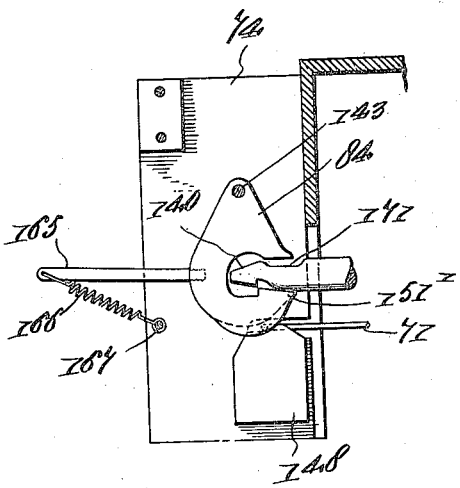
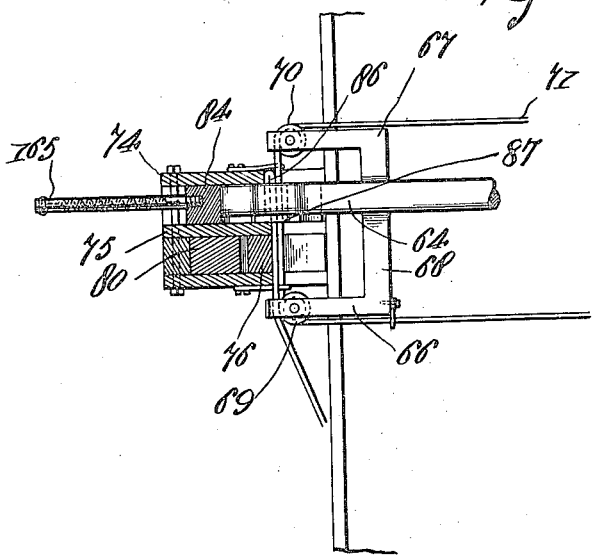

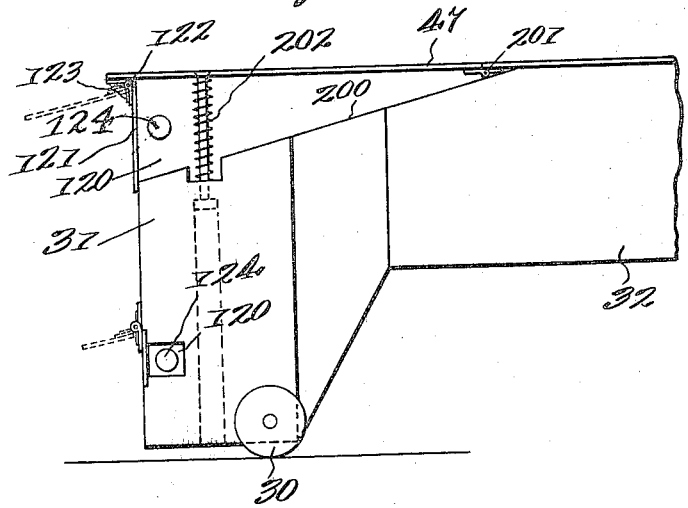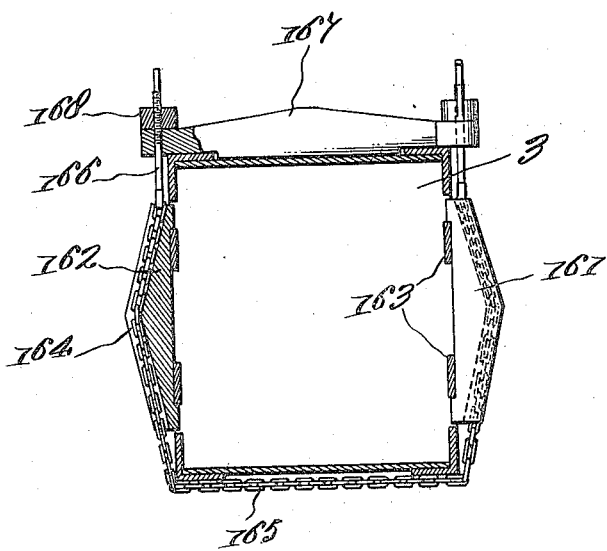

UNITED STATES PATENT OFFICE.

GEORGE W. NORTH, OF LA TUNA, TEXAS, ASSIGNOR OF ONE-HALF TO H. M. ANDREAS, OF EL PASO, TEXAS.

BALING-PRESS.

1,288,656.　　　　Specification of Letters Patent.　　Patented Dec. 24, 1918.

Application filed April 13, 1918.　Serial No. 228,411.

*To all whom it may concern:*

Be it known that I, GEORGE W. NORTH, a citizen of the United States, residing at La Tuna, in the county of El Paso and State of Texas, have invented certain new and useful Improvements in Baling-Presses; and I do hereby declare the following to be a full, clear, and exact description of the invention, such as will enable others skilled in the art to which it appertains to make and use the same.

The present invention relates to improvements in baling presses, and consists in certain improvements over my prior Patents No. 1,197,532, granted September 5, 1916, and No. 1,229,126, granted June 5, 1917, and more especially in improvements and certain added features in the latter.

It is one object of my present invention to improve the mechanism for operating the compressor and also the mechanism employed to actuate the feeder; such compressor and feeder mechanisms being grouped for operation from the movable power receiving elements of the press.

Another object of my present invention consists in dispensing with the block-dropping mechanism and in substituting therefor a device adapted to be projected across the mouth of the press trunk at the rear of the baling chamber, and in effecting the actuation of this device also from the movable parts of the press, and more particularly from the plunger driving mechanism.

My invention further contemplates certain changes in the tying mechanism, which consists more specifically in a reconstruction of the tying needles and coöperating dogs in order that the action between these parts may be more positive and the severing and holding of the tie wires and the escape of the needles from the dogs more easily and to a better degree accomplished.

A further object of the invention resides in certain new features in the trunk of the press by which such trunk can be made to exert the desired pressure on the bale which is in the process of formation therein.

In the accompanying drawings forming a part of this application, and in which similar reference symbols indicate corresponding parts in the several views:

Figure 1 is a side elevational view of an improved baling press constructed in accordance with my present invention.

Fig. 2 is a top plan view of the same.

Fig. 3 is a side elevational view, parts being broken away, of the improved press taken from the side opposite that shown in Fig. 1.

Fig. 4 is a transverse sectional view taken on the line 4—4 in Fig. 3.

Fig. 5 is a similar view taken on the line 5—5 in Fig. 3.

Fig. 6 is a longitudinal central sectional view of the baling press.

Fig. 7 is a transverse sectional view taken through the hopper and baling chamber, and illustrating the compressor as closed and the feeder in the advanced position.

Fig. 8 is a similar view illustrating the compressor open and the feeder retracted.

Fig. 11 is a transverse sectional view through the trunk of the press and illustrating the tying and hay-confining mechanism, partly in section and partly in elevation.

Fig. 12 is a top plan view, with parts thereof shown in section and illustrating the tying and hay-confining mechanisms.

Fig. 13 is a horizontal sectional view illustrating the tying needles withdrawn, the plunger in its final stage, and the hay-confining rods projected across the press.

Fig. 14 is an enlarged sectional view through the wire holding and cutting device showing the same in the rearward position.

Fig. 15 is a similar view illustrating the parts in the forward position;

Fig. 16 is an enlarged cross sectional view through the twisting and cutting mechanism.

Fig. 17 is an enlarged side elevational view of the plunger head and a portion of the plunger rod, and showing the open position of the plunger doors in dotted lines with the hay-confining rods occupying the recesses in the plunger; and Fig. 18 is a cross sectional view through the press trunk showing the improved compressing mechanism.

Figure 9:
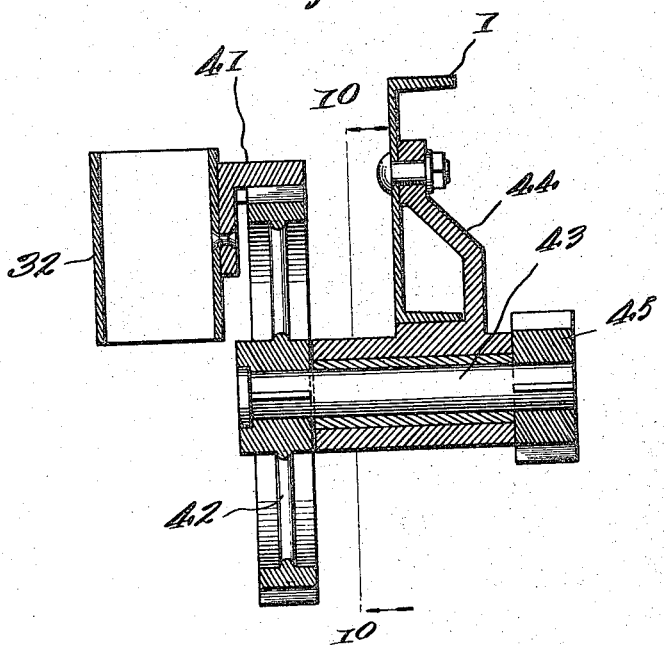
Fig. 9 is a cross sectional view through the plunger returning mechanism.
Figure 10:
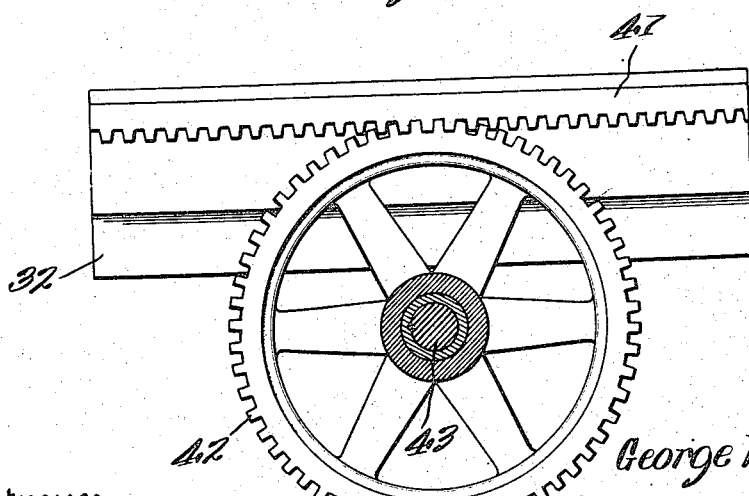
Fig. 10 is a sectional view taken on the line 10—10 in Fig. 9.

Referring more particularly to the drawings, and for the present to Figs. 1 to 10 inclusive, 1 designates generally a framework supported for transportation on wheels 2 and having built therein a trunk or barrel 3, in the forward portion of which is, as more particularly seen in Fig. 6, a baling chamber 4.

Above the baling chamber 4 is arranged a hopper 5 into which the hay or other material to be baled is thrown, and which is received on a door or compressor 6 when in the open position shown in Fig. 8; such compressor 6 being hinged, as indicated at 7, to permit the same to swing upwardly to the position shown in Fig. 7, thereby forcing the hay or other material previously received into the throat of the hopper 5, through which travels a feeder or presser-foot 8, for which see Figs. 7 and 8.

In describing the mechanism for actuating the compressor 6, reference is to be had to Figs. 2 and 3, where such compressor is found to be provided with a strap 9 having an eye 10 at one end in which is received a bolt 11. A link 12 has one of its ends engaged with the projecting end of such bolt 11, while at its other end it is loosely engaged over the rounded end of a lever 13 fulcrumed to rock as at 14 on the press frame 1. A roller 12', mounted at the connection of the link 12 and lever 13, is arranged to travel over a wear plate 13' bolted or otherwise secured to the press. Such lever 13 is bent, as indicated in Fig. 3, so that its actuating end may be arranged to underlie the cam 15 which is mounted on and continuously rotated from the driven shaft 16.

A roller 14' carried on an upstanding arm 15', is in constant wiping engagement with the cam surface so that the lever 13 may be rocked on the pivot 14 and close the compressor 6 when in the position shown in Fig. 3. There is a slot 16', as shown in Fig. 2, in the actuating end of the lever 13 to receive the cam 15 when the lobe of the latter passes from the roller 14' and permits such actuating slotted end of the lever to pass up on the cut-away part of said cam.

By reason of the construction just described I am enabled to secure a quick, accurate and powerful movement in closing the compressor 6, while, by virtue of the construction and disposition of the cam and slotted actuating end of the lever 13, the compressor is permitted to open quickly so as to give the operatives ample time to deposit thereon the next charge of hay before such compressor must again be closed.

At 17 is indicated a rest for the compressor 6 when in its open position, this rest consisting of a flat bar supported at its ends by the hopper sides. A coil spring 18 is connected between the bolt 11 and the rest 17 and is adapted to cause the opening of the compressor 6 when the lobe of the cam 15 passes from engagement with the end of the lever 13. Such spring 18 is selected of such a strength, size and construction that it will be effective to lift the compressor 6 from the finally closed position shown in Fig. 7 to a position just immediately to the left of the central vertical position, where it will become ineffective, to the end that the compressor may from this point descend by gravity onto the rest 17; its opening action being therefore quick and its impact with the rest 17 reduced as much as possible.

Now returning to Figs. 7 and 8, and considering in connection therewith Figs. 1 and 2, the feeder or compressor foot 8 is seen to be carried on the free end of a bent or curved arm 19 carried on a bell crank lever 19', the latter being mounted to pivot about a bracket 20 supported from the framework. Coöperating stops 20' and 21' are carried respectively on the bent arm 19 and hopper to limit the inward movement of the presser foot 8 and take up any impact incidental to the final movement thereof.

A toggle lever consisting of the links 22' and 23' is connected between the press framework and one arm of the bell crank lever 19', and this toggle lever is actuated by a link 22 which connects at one end with the toggle center and at its other end has a smooth round perforation to receive the rounded end of a lever 21. This lever 21 is mounted to rock in a bracket 23, and in the present instance is actuated from a crank pin 24 on a gear wheel 25 operating the cam slot 26 formed in the opposite end of the lever.

The gear wheel 25 is mounted on the driven shaft 16, and is in mesh with a pinion 27 on a drive shaft 28 to which is fixed a pulley 29. The pulley 29 is adapted to receive a belt (not shown) from a traction engine, by means of which latter the baling press may be drawn along on the wheels 2, or from other source of power.

Fitted to travel on rollers 30 in the baling chamber 4 is a plunger 31, preferably made in one casting and connected to be reciprocated therein from a plunger-rod 32. The plunger-rod 32 is advantageously constituted of a pair of beams assembled with their flanges directed upwardly, as more particularly shown in Fig. 4, which may be bolted or secured together in any suitable manner. At their rear ends the beams, constituting the plunger-rod 32, receive therebetween an inclined rack 33, for coöperating with a cam gear 34 mounted on the driven shaft 16 for advancing the plunger 31 to compress the charge of hay or other material previously delivered to the baling chamber 4.

At its rear and lower end the rack 33 is bent upwardly to provide an inclined wall 35, extending at substantially right angles to said rack and provided to be encountered by one end of the cam gear 34, as shown in Fig. 6, at the beginning of the advance stroke.

The plunger-rod 32 is, at its forward end, provided with ears 38, in which are journaled rollers 39 traveling on a track 40, illustrated in Figs. 5 and 6 to be supported from the framework 1.

To the plunger rod 32 is secured an overhanging rack 41 continuously in mesh with a gear wheel 42 on a shaft 43. This shaft 43 is supported in the framework 1 by a hanger 44, and is provided with a fixed pinion 45 adapted to mesh with a segmental rack 46 formed on the gear wheel 25.

As will be apparent from the various positions of the parts shown in the drawings, the segmental rack 46 will be disengaged from the pinion 45 during the advance stroke of the plunger 31. When, however, the cam gear 34 has disengaged the inclined rack 33, leaving the plunger 31 in its advanced position, the segmental rack 46 is so relatively disposed as to thereupon engage the pinion 45, and as the gear wheel 25 rotates farther will transmit, through the shaft 43, gear wheel 42 and rack 41, the necessary forward motion to the plunger-rod 32 to retract the plunger 31 to the initial position shown in Fig. 6, where the latter is in readiness to receive the next actuation. Immediately upon return of the plunger to initial position, the rack 46 is of a length to then leave the pinion 45 free, and such pinion may be rotated reversely through the shaft 43 and gear wheel 42 from the overhanging rack 41 when the plunger 31 is being advanced from the cam gear 34.

Extending above the plunger 31 and rod 32 is a false bottom 47 secured in any suitable manner. This bottom 47 prevents the entrance of material through the throat of the hopper 5 and into the mechanism behind the plunger 31, so as to clog the same or interfere with its free operation.

Referring momentarily to Fig. 17, the plunger 31 is shown to be provided with recesses 120 which are cut through the operating front face thereof, where they are normally closed by doors 121 hinged as indicated at 122, and yieldingly urged to the closed position by springs 123. These recesses 120 pass completely through the plunger head 31 in a transverse direction and open out at both sides of such plunger head so that they may receive the hay-confining rods 124, which are shown in the recesses in Fig. 17. Although these rods and plunger recesses are shown to be two in number they may, of course, be multiplied as found necessary or desirable.

Such rods 124, as appears in Fig. 11, are connected for simultaneous operation to a vertical bar 150 to which one end of a link 151 is coupled. A similar link 152 has a pivotal connection with the other end of said link 151; this last-mentioned link 152 being fixed on a rock shaft 153 journaled in suitable bearings on the press and extending longitudinally thereof. A coil spring 154 has its ends connected between the bar 150 and a fixed part on the press, and when released it will act to draw the rods 124 across the mouth of the trunk 3 just in rear of the hopper and baling chamber, where such rods are located. In Fig. 13 the rods 124 are shown in their advanced position passing through the plunger head, which is indicated in dotted lines. A second spring 155 may be connected between the links 151 and 152 and any appropriate part of the press in order to draw these links upwardly and assist in driving the rods. Appropriate supports are provided to permit the rods 124 to have a sliding movement across the press.

Referring now more particularly to Figs. 1, 2 and 3, the forward end of the rock shaft 153 is provided with a right angularly bent arm 156 turned inwardly and disposed in the path of a cam rail 160 carried by a depending web on the rack bar 33; this cam rail 160 is preferably of angle iron construction, it being pivoted as indicated at 157 to permit vertical swinging and having in its lower end an open slot 158 adapted to rest upon a pin 159 also on the rack web.

In their normal position the bars 124 are thrust across the trunk to prevent the hay which has been compressed into the bale from expanding back into the baling chamber after the plunger has retreated. In this position they are held by the springs 154 and 155. However, it becomes necessary to admit hay to the forming bale upon each successive advance stroke of the plunger, and to this end the rods 124 are arranged to be removed from the trunk at such times. This is accomplished in the following manner:

As previously described, the inclined rack 33 which is carried by the plunger rod 32, is driven forward together with the plunger by means of the cam gear 34 which meshes therewith, and in so moving forward said inclined rack 33 carries therewith the cam rail 160. Such cam rail 160 will encounter the arm 156 and cause the free end of such arm to ride upwardly thereon as the inclined rack proceeds. In moving up this inclined rail 160, the arm 156 will act to turn the rock shaft 153 in a counterclockwise direction, as looked at in Fig. 11, causing the link 152 to be swung toward the left, and transmitting to the rods 124 the necessary motion to cause them to assume the position shown in this Fig. 11, where they are withdrawn. This action takes place in opposition to the influence of the springs 154 and 155.

Coming back to Fig. 3, the cam rail 160 and arm 156 are so coördinated that when the plunger 31 arrives at the final limit of its advance motion, the left hand end of the cam rail will have just moved to the right of said arm 156, allowing the latter to drop therefrom and the rods 124 to be pulled across the press by their springs. The rods will remain in the projected position, holding the compressed hay in place throughout the retiring movement of the plunger. When the plunger recedes the bars 124 will strike the doors 121 and force them open to allow said bars to escape and to obviate interference with the plunger's retirement. On this retiring movement of the plunger and inclined rack 33, the under side of the cam rail 160 will be brought into engagement with the arm 156. Contact between the two will result in the lifting of the cam rail 160, it being remembered that it is free to swing about the pivot 157. The arm 156 in its normal low position is sufficiently high, of course, to escape contact with the pin 159 which supports the lower swinging end of the cam rail 160. The rail 160 will, of course, drop back to the original position shown in Fig. 3 after the arm 156 has been passed.

Referring more particularly to Fig. 18, the trunk 3 into which the hay or other material to be baled is compressed, is preferably provided with compression blocks 161 and 162 on each side thereof, which are held on suitable slats or other parts 163 capable of contracting or moving inwardly. Each of the compression blocks is provided with a groove 164 which is offset from the true vertical line. The grooves 164 are designed to receive a chain 165 which passes about the outside of the trunk 3, and has its end attached to eyebolts 166 passing up through the ends of a beam 167. Nuts 168 provide for tightening or loosening the bolts 166 through which an adjustment of the compression blocks 161 and 162 may be had in order that the desired lateral compression may be communicated to the bale.

Referring now more particularly to Figs. 11, 12 and 13, inclusive, in connection with Fig. 1, wherein the improved tying mechanism is illustrated, 60 designates the carriage, including a plurality of rods 61 fitted to slide through openings in a framework 63 secured as by the bolts shown, or other means, to the trunk or barrel 3. The framework 63 may be also supported on guides 62 which project out from the press frame and are connected at their outer ends by a vertical bar 69'. The carriage 60 which carries the several rods 61 is provided with openings whereby it is received about and made slidable on the guides 62, in this manner steadying the carriage and needle rods and dispensing with the necessity of providing elongated tubular bearings for such rods.

The inner ends of the rods 61 are made into needles 64 having undercut notches 65. As disclosed to advantage in Figs. 13 and 16, the needles 64 project substantially centrally between arms 66 and 67 forming part of a yoke 68 supported from the inner ends of the rods 61; such arms 66 and 67 carrying rollers 69 and 70 over which is passed the tying wire which is designated at 71.

The tie wires 71 may be of any suitable number to correspond with the number of needles 64 and associated arms 66 and 67 employed, and may be carried on reels on a separate frame; or such reels of wire may be journaled on the framework of the press, as commonly done in this art, and which will be understood without further illustration.

From the reels the wire 71 is received and passed through eyes 73 Fig. 13 having flared mouths for facilitating insertion therethrough. On the side of the trunk 3 transversely opposite to the frame 63 supporting the needle carriage, is a casing 74 divided centrally by a partition 75 providing a vertical compartment for receiving the twisting wheels 76.

The twisting wheels 76 are provided with the usual radial slots 79, between which the doubled ends of the tie wires are received and revolved to twist the same together when the wheels are put in motion. The wheels 76 are formed with teeth to engage a vertically reciprocating rack 80, slidable through the frame 74 and in engagement to be actuated from a pinion 81 journaled in ears 82 projecting from the top of the barrel 3. The gear wheel 81 is of a width to extend beyond the rack 80, where it also meshes with a horizontally reciprocating rack 83, carried by and receiving its movement from the needle carriage 60. It will therefore be seen that when the carriage 60 is put in motion to convey the tie wires 71 across the trunk 3 after a bale has been completely formed, by moving the rack 83 therewith will operate to rotate the pinion 81 and communicate motion to the rack 80 and twisting wheels 76.

In the compartment of the casing 74, to the other side of partition 75, are fitted a series of pivoted dogs 84 and cutters 85 adapted to operate in conjunction with the needles 64, whereby the tie wires 71 will be caught in said dogs in substantially the manner indicated at 86 in Fig. 16, and will be severed by the cutters 85 at the point indicated at 87.

The carriage 60 is adapted to be reciprocated across the trunk 3 by movement derived through a link 88 from a gear wheel 89 supported on a shaft 90 journaled in a bracket 91 secured to the trunk 3, or other part of the framework of the press. Meshing with the gear wheel 89 is a pinion 93 on a shaft 94, and mounted to slide thereon as by a key and groove, or other arrangement. The shaft 94 is journaled to rotate in bearings 95, and has on its forward end a bevel pinion 96 continuously in mesh with a similar pinion 97 fitted on a shaft 98. On the said shaft 98 is also mounted a spur pinion 99 adapted to mesh with a segmental rack 100 formed on the gear wheel 25 opposite to the internal segmental rack 46.

A coil spring 101 is wound about the shaft 95 between the adjacent bearing 95 and the slidable pinion 93, and operating to move said slidable pinion 93 into mesh with the companion pinion 89; and for purposes of facilitating the engagement of such pinions, the teeth thereon may be suitably rounded off.

The pinion 93 is formed with, or secured to a collar 102, pivotally connected to the bifurcated ends 103 and 104 of an arm 105. At its opposite end the arm is bent, as indicated in Fig. 12, and carries a bevel block 106 adapted to occupy a correspondingly formed notch 107 in a U-shaped bracket 108 secured to the press framework, and engageable by a beveled lug 109 on a reciprocating latch rod 110. With the latch rod 110 is associated a coil spring 111 for normally tending to move said latch rod to disengage the lug 109 from the bevel block 106. At its opposite end the latch rod 110 has its extremity turn upwardly to provide an abutment 112 to be encountered by a projection 113 on a rotating shaft 114.

A coil spring 115 is connected between the arm 105 and the press framework, and acts to draw the arm downwardly to engage the bevel block 106 with the notch 107 in the bracket 108, whereby the collar 102 and shiftable pinion 93 are held in the position shown in Fig. 12 of the drawings, wherein said pinion 93 is out of mesh with the gear wheel 89. When the bale is formed in the trunk 3, however, the projection 113 will be so timed as to thereupon encounter the abutment 112 and move the latch rod 110, against the influence of its spring 111, to engage the lug 109 with the bevel block 106, thereby raising the free end of the arm 105 about its pivotal connection with the collar 102 and in opposition to the spring 115. When the arm 105 is thus raised, the beveled block 106 is thereby disengaged from the notch 107 in the bracket 108, thus releasing the slidable pinion 93 to the action of the coil spring 101, which immediately moves such pinion along the shaft 94 and into mesh with the gear wheel 89. When in mesh, and the external segmental rack 100 on the rear wheel 25 meshes with and rotates the pinion 99, through the bevel gear wheels 96 and 97, rotation will be imparted to the shaft 94 which will rotate the slidable pinion 93, transmitting rotation to the gear wheel 89, which will reciprocate the carriage 60.

The shaft 114 carrying the projection 113 is journaled in brackets 116 on the trunk 3, and supports a toothed wheel 117 projecting through a slot 118 in said trunk to be engaged by the baled material which is pushed through the trunk by the action of the plunger. When the baled hay passes through the trunk and engages with the teeth of the wheel 117, the shaft 114 will be rotated, and the parts will be so proportioned that a sufficient amount of material to form a bale of predetermined size will pass and actuate the wheel 117 through one complete revolution, the projection 113 being thereby rotated to actuate the latch tripping mechanism and releasing the slidable pinion 93 to permit engagement of the same with the gear wheel 89, completing the chain of transmission through which the carriage 60 is reciprocated.

Passing through the bifurcated ends 103 and 104 of the arm 105, is a pin or bolt 125 which is adapted to confine one end of a lever 126 fulcrumed at 127 on an arm 128. The lower end of the lever 126 connects with a curved link 129 coupled to a pivoted latch 130, projecting into the path of the plunger or plunger rod and adapted to be struck thereby on its return stroke to move said arm rearwardly, rocking the lever 126, which will swing the arm 105 forwardly, carrying the pinion out of mesh with the gear wheel 89 and restoring the bevel block 106 into confinement in the notch 107 in the bracket 108. The transmission connecting the carriage 60 with the movable parts of the press will thus be disengaged and the plunger may be operated through a sufficient number of strokes to form a subsequent bale before the toothed wheel 117 will execute a complete revolution to again bring the projection 113 to engage the abutment 112 and trip the latch 110.

There are preferably doors 130' hinged as indicated at 131 and 132, and with which are associated springs for normally moving the doors to the position shown in Fig. 13. These doors 130' are opened by the action of the plunger forcing the material therethrough, and automatically return to position through their springs after the plunger has retired. They thus provide a clearance space for the free movement of the needle carriage 60.

Referring in detail to Figs. 14, 15 and 16, the dogs 84 are preferably provided with knives or cutters 85 which are formed in the same piece therewith and forwardly of the under side thereof. The cam or binding surface 85' of each of the dogs coöperates with the block or anvil 148 whereby the two wires are tightly bound thereon. The dogs are pivoted as at 143, and carry rods 165 to the free ends of which are connected the coil springs 166 attached at their other ends 167 to some fixed part. The function of said springs 166 is to assist in returning the dogs to the original forward position and to maintain such dogs in this forward initial position when the needles are withdrawn.

Each dog 84 is provided with a hollowed out interior 168 having a communicating mouth 169 in position to receive the ends of the needles 64. The inclined upper ends 140 of the needles strike the upper lips 170 of the dogs, and these two parts coöperate to guide the needles into the mouths 169 and against the rear walls of the dogs, after which continued motion of the needles will cause such dogs to be swung backward on their pivots 143, as indicated in Fig. 14, thus allowing the wires to be placed upon the anvil 148. This swinging motion of the dog 84 causes the undercut notch 65 on the needle to interlock with the shoulder 142 on the dog, and also causes the upper lip 170 to descend with respect to the needle 64, in view of which I find it necessary to provide a recess 171 in the upper edge of the needle at the point indicated.

When the wires have been properly placed in the twisting wheels 76 on the anvil 148 by the action of the arms 66 and 67, as shown in Fig. 16, the carriage is returned, which causes the needles to be moved to the right. The undercut notches 65, engaging with the shoulders 142, cause the dogs 84 to be swung forward to the right, carrying the cutters 85 across the tie wires, thereby severing same and at the same time bringing the surface 85' into binding action upon the top of the anvil 148 to secure the end of the tie wire, whereby to hold it while the next bale is being formed. As the dogs are swung to the right, the cam 151' thereon will engage beneath the needle 64 and raise the same to disengage its notch from the shoulder 142, after which its escape from the dog is permitted.

The operation of the present invention may be described as follows:

Having been drawn along by traction power or draft animals to the required location, the pulley 29 is engaged with a belt from the power source, or other agency supplied to drive either the shaft 28 or the shaft 16, it being immaterial to my present invention whence and in what manner the power may be derived and applied.

With the power applied, the parts are moved to the initial position with the plunger 31 retired, as in Fig. 6, and the compressor door 6 in the lowered position shown in Fig. 8, the presser foot being also retracted, as here shown. The operator now throws the hay or other material to be baled into the hopper 5, where it is received upon the compressor door 6. After sufficient material has been loaded into the hopper 5, the machine is set in motion from the power source, and the drive shaft 28 revolving, will, through the pinion 27 and gear wheel 25, transmit rotary motion to the driven shaft 16, upon which is fitted the cam 15, as clearly shown in Fig. 3. As the cam 15 rotates it will depress the lever 13 in Fig. 3, and raise and close the compressor 6, this closed position being indicated in Fig. 7.

By this movement the material previously placed in the hopper 5 will be deposited in the throat thereof and in the path of the presser foot 8, which, as indicated in Fig. 7, will be subsequently driven down through its actuating mechanism to force the material from the throat of the hopper into the baling chamber 4, where it will be subsequently compressed by the plunger 31.

The presser foot 8 is actuated from the pin 24 on the gear wheel 25 which operates in the cam slot 26. When moving to the lower position shown in Fig. 1, the pin 24 carries therewith the connected end of the lever 21, rocking the same about the fulcrum 23 and elevating the opposed end to which the bent arm 19, carrying the presser foot 8, is connected through the link 22 and toggle lever. The presser foot 8, after descending to drive the material into the baling chamber 4, will at least be withdrawn sufficiently from the baling chamber 4 to permit the passage of the plunger 31 before the mechanism of the latter is put so far in motion as to cause interference between these two coacting agencies.

Following upon the delivery of the material to the baling chamber by the action of the presser foot 8, the cam gear 34 will move to engage the inclined wall 35 on the rack 33 and put the plunger rod 32 in motion. The plunger 31 and rod 32 will be moved but a short distance before the teeth on the cam gear 34 will come to engage the corresponding teeth on the inclined rack 33, and by such engagement the motion of the plunger will be continued, increased power being obtained as the cam gear 34 rotates. By this means the plunger 31 will be moved through its advanced stroke in the baling chamber 4, forcing before it the material introduced therein and compressing such material in the trunk 3.

At any stage of the cycle of operations after the material has been introduced into the baling chamber 4, the compressor door 6 may be returned to the lower position shown in Fig. 8, in readiness to receive the next load of hay. By having the compressor door 6 returned at an early stage, the operator will have ample time to deposit subsequent loads within the hopper 5 without requiring the machinery to be stopped at each repetition of the cycle of operations.

When the plunger has been finally advanced and reaches the end of its movement, the hay-confining bars 124 will be released by reason of the arm 156 dropping from the end of the cam rail 160, and the springs 154 and 155 will then be free to draw these rods 124 across the trunk and through the plunger recesses.

After having advanced the plunger 31 and disengaged the cam gear from the rack 33, the gear wheel 25 will now bring the segmental rack 46 to engage the pinion 45 on the shaft 43. Continued rotation of the gear wheel 25 will now transmit a rotary motion through the pinion 45 to the shaft 43 and to the gear wheel 42, which is in mesh with the overhanging rack 41 on the plunger rod 32. The motion thus derived will be in a reverse direction to that developed from the cam gear 34, and will consequently operate to return the plunger 31 to its initial position shown in Fig. 6, where it will be in readiness for the next advance actuation.

When this function of returning the plunger 31 to initial position has been accomplished, the rack 46 will move to disengage the pinion 45 and leave the latter and its shaft 43 free to be rotated in a counterclockwise direction, as impelled by the advance motion of the plunger 31.

From time to time, as sufficient hay accumulates in the trunk 3 to form a completed bale, the needle carriage will be actuated and the tying of the bale accomplished in a manner which will be clear from the foregoing description.

The plunger 31 and plunger rod 32 are cut away along the upper faces thereof as indicated at 200 in Fig. 17, to permit the top 47 which is hinged as indicated at 201, to swing down in case of meeting obstacles in its passage. Said top 47 is normally held in the raised position and is constantly urged to return to this normal position when depressed by means of the coil spring 202. Such top 47 is intended to move beneath and close against the feeder foot 8 so as to remove all hay therefrom.

It is obvious that those skilled in the art may vary the details of construction and arrangements of parts without departing from the spirit of my invention, and therefore I do not wish to be limited to such features except as may be required by the claims.

I claim:

1. In a baling press, a hopper, a compressor door associated with said hopper, a slotted lever mounted to oscillate on the baling press, a connection between one end of said lever and said compressor door, a rotating cam arranged above and adapted to engage the other end of said lever to shift the latter whereby to close said compressor door, the cam adapted to be received by the slot in said lever when the door is opened, substantially as described.

2. In a baling press, a hopper, a compressor door for said hopper, a lever having a slot in one end mounted on the baling press, a connection between the other end of said lever and said compressor door, a continuously rotating cam driven from the movable parts of the press and arranged to be received through the slot in said lever, and an upstanding arm on the slotted end of said lever disposed in wiping engagement with said cam, substantially as described.

3. In a baling press, a hopper, a movable compressor door for said hopper, a lever having one end slotted fulcrumed to rock on the baling press, a guide for the slotted end of said lever, a continuously rotating cam adapted to be received through the slot in said lever, an arm projecting from the slotted end of said lever, said arm disposed in wiping engagement with said cam, and a connecting rod coupling the opposite end of said lever to said compressor door, substantially as described.

4. In a baling press, a hopper, a compressor door adapted to swing to an open and closed position with relation to said hopper, a rest for receiving said door when in the open position, means for closing said door, and means for swinging said door back past the central vertical position, said means becoming then ineffective and allowing the compressor door to descend by gravity onto said rest, substantially as described.

5. In a baling press, the combination of a hopper, a compressor door for said hopper, means for closing said compressor door, a rest for receiving said compressor door when in the open position, and spring means for starting said door on its open movement and adapted to draw the door past the central vertical position where it may descend by gravity onto said rest, substantially as described.

6. In a baling press, a hopper, a compressor door hinged to said hopper, a rest for holding said compressor door in the open position, a lever, a connection between one end of said lever and said door, a cam for encountering the other end of said lever and shifting the same to close said door, and means for starting the door on its opening movement when said last-named means is out of effective operation, said opening means adapted to draw the door past the central vertical position where it may fall by gravity to the full open position supported on said rest, substantially as described.

7. In a baling press, a hopper, a feeder foot movable in said hopper, a curved arm supporting said feeder foot, a bell crank lever carrying said arm and having a pivotal connection with the press, coöperating stops arranged between said arm and hopper for limiting the inward movement of said feeder foot, a toggle lever connected between the press and said bell crank, a lever fulcrumed on the framework, a connection between one end of said lever and the toggle center, and means engaging the other end of said lever and operated by the movable parts of the press for automatically rocking the lever, substantially as described.

8. In a baling press, a baling chamber, a trunk communicating with said baling chamber, a plunger arranged to travel through said baling chamber and drive the material deposited therein into said trunk, means adapted to pass across the trunk at the mouth thereof to confine the hay therein, means for actuating said last-named means at the completion of each advance stroke of said plunger, and means for retracting said hay-confining means from the trunk as the plunger moves on its advance stroke, substantially as described.

9. In a baling press, a trunk, a baling chamber in communication with said trunk, a plunger fitted to move in said baling chamber and adapted to press the material into said trunk, means for driving said plunger, hay-confining means adapted to be projected across said trunk at the mouth thereof, means for driving said last named means across the trunk at the completion of the plunger advance motion, and means actuated from the plunger driving means for causing said hay-confining means to be withdrawn from said trunk as the plunger advances, substantially as described.

10. In a baling press, a baling chamber, a trunk communicating with said baling chamber, a plunger movable in said baling chamber, hay-confining rods adapted to be projected across said trunk at the mouth thereof, spring means for drawing said rods across said trunk at the time of the completion of the plunger's advance stroke, and means adapted to return said rods to position without said trunk, substantially as described.

11. In a baling press, a baling chamber, a trunk communicating with said baling chamber, a plunger adapted to travel through said baling chamber, means for driving said plunger on its forward stroke, hay-confining means movable across said trunk, a rock shaft, connections between said rock shaft and hay-confining means, coöperating parts between said rock shaft and plunger driving mechanism whereby to cause said hay-confining means to be withdrawn from said trunk, and means for drawing said hay-confining means across said trunk as soon as the plunger finishes its advance stroke, substantially as described.

12. In a baling press, the combination of a baling chamber, a trunk communicating with the baling chamber, a plunger traveling in said baling chamber, mechanism for driving said plunger, hay-confining means arranged to be projected across said trunk, a rock shaft journaled on the press, connections between said rock shaft and hay-confining means, an arm on said rock shaft, a cam part on the plunger driving mechanism adapted to advance and engage said arm whereby to shift the rock shaft and hay-confining means to remove the latter from the trunk, said cam adapted to disengage said arm at the end of the plunger's stroke, and means for returning said hay-confining means to normal position across said trunk after the cam disengages said arm, substantially as described.

13. In a baling press, a baling chamber, a trunk, a plunger movable in said baling chamber, mechanism for driving said plunger, hay-confining means movable across said trunk, a rock shaft journaled on said press, connections between said rock shaft and hay-confining means, an arm on said rock shaft, a swinging cam rail movable with the plunger actuating mechanism and adapted to encounter and move said arm to swing said rock shaft and hay-confining means, and means independent of said foregoing means for returning the hay-confining means to position across said trunk, substantially as described.

14. In a baling press, a baling chamber, a trunk adjoining said baling chamber, a plunger adapted to be driven through said baling chamber, mechanism for driving said plunger, hay-confining means movable transversely across said trunk, a rock shaft journaled on the press frame, means connecting said rock shaft with said hay-confining means, an arm on said rock shaft, a cam rail in the path of said arm and adapted to engage said arm and raise the same when the plunger is driven in the advance direction, the arm adapted to drop off the end of said cam rail when the plunger is in the finally advanced stage, said cam rail being pivoted and adapted to swing upwardly when the same on its return movement comes in contact with said arm, substantially as described.

15. In a baling press, a trunk, a baling chamber adjoining said trunk, a plunger adapted to travel through said baling chamber, hay-confining means arranged to pass across said trunk, a movable arm in connection with mechanism whereby to remove said hay-confining means from said trunk, a pivoted cam rail adapted to encounter and actuate said arm on the advance motion of the plunger to withdraw said hay-confining means and adapted to disengage said arm at the end of the plunger's stroke, the arm adapted to engage beneath said cam rail and raise the same on the return stroke of the plunger, and means for moving said hay-confining means across said trunk when the arm is disengaged from said cam rail, substantially as described.

16. In a baling press, a trunk, a baling chamber, a plunger adapted to travel through said baling chamber, mechanism for advancing said plunger, rods movable across said trunk, a bar attached to said rods, a rock shaft journaled on the press, a pair of links connected between said rock shaft and bar, a spring connected between said bar and the press for drawing said rods across said trunk, a spring connected to said links and one of the press parts for also assisting to draw the rods across the trunk, and means for actuating said rock shaft to withdraw the bars in opposition to said springs, substantially as described.

17. In a baling press, a baling chamber, a trunk, a plunger traveling in said baling chamber, mechanism to advance said plunger, rods adapted to pass across said trunk, spring means for drawing said rods across said trunk, a rock shaft journaled on the press frame, a pair of links connected between said rock shaft and said rods, and means automatically actuated from the plunger driving mechanism whereby to turn said rock shaft and cause the withdrawal of said rods from the trunk, substantially as described.

18. In a baling press, a trunk, a communicating baling chamber, a plunger traveling through said baling chamber, said plunger having a recess therein, hay-confining means passing across said trunk and adapted to enter the recess in said plunger, and means for driving said hay-confining means across the trunk and through the plunger recess when the plunger reaches the limit of its advance motion, substantially as described.

19. In a baling press, the combination of a trunk, a baling chamber, a plunger movable in said baling chamber, mechanism to drive said plunger, said plunger having recesses therein, movable doors adapted to close said recesses, rods passing across said trunk and adapted to be received through said plunger recesses, means for driving the rods across the trunk when the plunger is at the limit of its advance movement, the said plunger doors adapted to be automatically opened by said rods when the plunger is retracted, substantially as described.

20. In a baling press, the combination of a trunk, a baling chamber adjoining said trunk, a plunger fitted to reciprocate in said baling chamber and having recesses therein, movable doors for closing said recesses, spring means for constantly tending to close said doors, rods adapted to pass across said trunk and be received through said plunger recesses, the plunger doors adapted to be opened by said rods when the plunger is retracted and to thereafter automatically close under the influence of said spring means, substantially as described.

21. In a baling press, the combination of a baling chamber, a trunk adjoining said baling chamber, a plunger having recesses therein fitted to travel in said baling chamber, movable doors having automatic closing means carried by said plunger, rods adapted to move across said trunk and through said plunger recesses when the plunger is at the limit of its advance motion, an arm in connection to withdraw said rods from the trunk, cam means carried by the plunger actuating mechanism for imparting movement to said arm, and other means for drawing said bars across said trunk and through said plunger recesses, substantially as described.

22. In a baling press, the combination of a trunk, a baling chamber, a plunger having recesses fitted to travel through said baling chamber, doors for closing said recesses, bars adapted to pass across said trunk and through said plunger recesses, a rock shaft journaled on the press, means connecting said rock shaft to guide said bars, an arm on said rock shaft, a cam rail movable together with said plunger, said cam rail adapted to strike and shift said arm to rock said shaft whereby to cause the withdrawal of said rods from said trunk, and means for moving said rods across said trunk and through said plunger recesses when the cam rail moves out of engagement with said arm, substantially as described.

23. In a baling press, the combination of a trunk, a baling chamber, a plunger fitted to travel in said baling chamber, a plunger rod connected to said plunger, an inclined rack carried by said plunger rod, a cam gear adapted to mesh with said rack to drive the plunger on its advance motion, a cam rail movable together with said plunger rod, means in the path of said cam rail and adapted to be actuated thereby, and hay-confining means in connection to be actuated by said last-named means whereby to withdraw the former from said trunk, and means for drawing said hay-confining means across said trunk, substantially as described.

24. In a baling press, a trunk, a baling chamber, a plunger traveling in said baling chamber, a plunger rod connected to said plunger, an inclined rack carried by said plunger rod, a rotating cam gear adapted to engage said inclined rack to drive the plunger on its advance stroke, a cam rail carried by and movable with said inclined rack, an arm in the path of said cam rail and arranged to be shifted when the plunger is moved on its advance stroke, a rock shaft turned by the movement of said arm, hay-confining means adapted to pass across said trunk, means connecting said hay-confining means to said rock shaft whereby to withdraw said hay-confining means when the cam rail actuates said arm, and spring means for returning said hay-confining means across said trunk, substantially as described.

25. In a baling press, a trunk, a baling chamber adjoining said trunk, a plunger fitted to travel through said baling chamber, a plunger rod connected to said plunger, an inclined rack carried by said plunger rod, a rotating cam gear adapted to engage said inclined rack to drive the plunger on its forward stroke, a swinging cam rail mounted on said inclined rack, an arm adapted to be engaged and lifted on the forward movement of said rail, the arm adapted to engage beneath said rail and lift said rail on the return movement, a rock shaft journaled on the press frame, hay-confining means adapted to pass across said trunk, means connecting said rock shaft and hay-confining means whereby to withdraw the latter from said trunk on the forward movement of the plunger, means for returning said hay-confining means across said trunk when the plunger arrives at the limit of its advance motion, and means for returning said plunger to initial position in readiness for the next advancing actuation, substantially as described.

26. In a baling press, the combination of a trunk, a baling chamber adjoining said trunk, a plunger fitted to reciprocate in said baling chamber, recesses in said plunger, spring-pressed doors closing said recesses, rods adapted to pass across said trunk and through said plunger recesses, means for causing said rods to so pass across said trunk, a rock shaft, means connecting said rock shaft with said rods, an arm on said rock shaft, a plunger rod, an inclined rack carried by said plunger rod, a cam gear adapted to engage with said inclined rack to drive the plunger on its advance stroke, a cam rail carried by said rack and adapted to engage said arm to swing the same and said rock shaft to withdraw said rods from the trunk, a second rack carried by said plunger rod, a gear constantly in mesh with said rack, and means for intermittently actuating said last-named gear to cause said plunger to be retracted after each advance actuation, substantially as described.

27. In a baling press, a trunk, a baling chamber communicating with said trunk, a plunger having recesses therein fitted to travel in said baling chamber, spring-pressed doors for closing said recesses, a plunger rod, an inclined rack carried by said plunger rod, said rack having an angularly disposed forward end, a rotating cam gear adapted to strike the angular end of said rack to start the plunger on its advance stroke and to mesh with said rack to carry the plunger through the remainder of the advance stroke, a second rack carried by said plunger rod, a gear meshing with said second rack, a pinion adapted to drive said gear, a segmental rack for intermittently rotating said pinion to restore said plunger to initial position after each advance actuation, rods adapted to pass across said trunk and through said plunger recesses, means for drawing said rods across said trunk, and means for withdrawing said rods from said trunk including a cam shaft, means connecting said cam shaft at one end with said rods, an arm at the other end of said cam shaft and a cam rail in the path of said arm and carried by said inclined rack for shifting said arm and rock shaft on the advance motion of the plunger, substantially as described.

28. In a baling press, a baling chamber, a trunk, a hopper arranged to deliver the material to said baling chamber, a compressor associated with said hopper, means for closing said compressor, means for starting the compressor on its opening movement but adapted to become ineffective before the full opening movement is completed whereby to allow the compressor to come gently to rest, a feeder, a toggle lever connected to actuate said feeder, means connected to the toggle center and operated by the moving parts of the press to cause the feeder to travel through the hopper consequent upon the closing of said compressor whereby to deliver the material into the baling chamber, a plunger fitted to travel in said baling chamber, means for driving said plunger, hay-confining means adapted to be passed through said trunk, means for drawing said hay-confining means across said trunk after the plunger has delivered each successive charge of hay to the trunk, and means for retracting the plunger, substantially as described.

29. In a baling press, a trunk, a baling chamber, a hopper, a compressor associated with said hopper, a lever fulcrumed on the press, a connection between one end of said lever and said compressor, the other end of said lever being slotted, an upstanding arm on the slotted end of said lever, a rotating cam driven from the movable parts of the press and adapted to be received in the slot in said lever, said cam having a wiping engagement with said upstanding arm whereby to rock the lever and cause the closing of said compressor, independent means for causing the opening of said compressor, a feeder adapted to travel through said hopper, a toggle lever connected to operate said compressor, a second lever mounted to rock on the press, a connection between one end of said second named lever and the toggle center, means operated from the movable parts of the press and having engagement with the other end of said last-named lever to rock the same and cause the actuation of said feeder, a plunger fitted to travel in said baling chamber and having pockets therein, normally closed doors for said pockets, hay-confining means, means for drawing said hay-confining means across said trunk and through the plunger pockets, means for withdrawing said hay-confining means while the plunger is being advanced, and means for actuating said plunger, substantially as described.

30. In a baling press, a tying mechanism including a carriage adapted to be driven across the press, needles carried by said carriage, said needles having inclined upper free ends in advance of recesses formed in their upper edges, said needles also having undercut notches in their lower edges, means for supporting the tie wires also movable with the carriage, anvils to receive the tie wires from said means, dogs pivoted to swing above said anvils and having cam portions adapted to bind the tie wires on the anvils, said dogs also having integral cutters for passing along the sides of the anvils to sever the tie wires, said dogs being made of solid blocks having their central portions cut out and also having mouths opening through their edges and communicating with the cut-out central parts, the mouths arranged to admit the forward ends of the needles to the cut-out central parts, lips on the dogs adapted to be encountered by the inclined upper free ends of the needles and to be received into the recesses in the upper edges of the needles, shoulders on the dogs to interlock with the undercut notches on the needles, rods projecting from the dogs, and springs connected between the free ends of said rods and a fixed part of the press whereby to yieldingly urge the dogs into an initial forward position, substantially as described.

In testimony whereof, I affix my signature.

GEO. W. NORTH.